(No Model.)

G. BANKS.
SEAT FOR AGRICULTURAL MACHINES OR VEHICLES.

No. 493,573. Patented Mar. 14, 1893.

Witnesses:
E. P. Ellis,
J. M. Nesbit

Inventor:
Geo. Banks,
per Lehmann & Pattison,
Attys.

UNITED STATES PATENT OFFICE.

GEORGE BANKS, OF OAKFIELD, MICHIGAN.

SEAT FOR AGRICULTURAL MACHINES OR VEHICLES.

SPECIFICATION forming part of Letters Patent No. 493,573, dated March 14, 1893.

Application filed February 3, 1891. Serial No. 380,080. (No model.)

*To all whom it may concern:*

Be it known that I, GEORGE BANKS, of Oakfield, in the county of Kent and State of Michigan, have invented certain new and useful Improvements in Seats for Agricultural Machines or Vehicles; and I do hereby declare the following to be a full, clear, and exact description of the invention, such as will enable others skilled in the art to which it pertains to make and use it, reference being had to the accompanying drawings, which form part of this specification.

My invention relates to an improvement in seats for agricultural machines and vehicles; and it consists in the combination and construction of parts which will be fully described hereinafter.

The object of my invention is to pivot the seats of agricultural machines or implements of the riding class, and vehicles of every kind such as have seats designed for a single person to ride upon, at their rear and front edges upon a suitable support, so as to overcome the lateral and back and forth movements, and the movement which is caused by the horse motion, and thus render the seat safer to ride upon, and more comfortable than where the seats are simply secured to spring supports in the usual manner.

Figure 1:
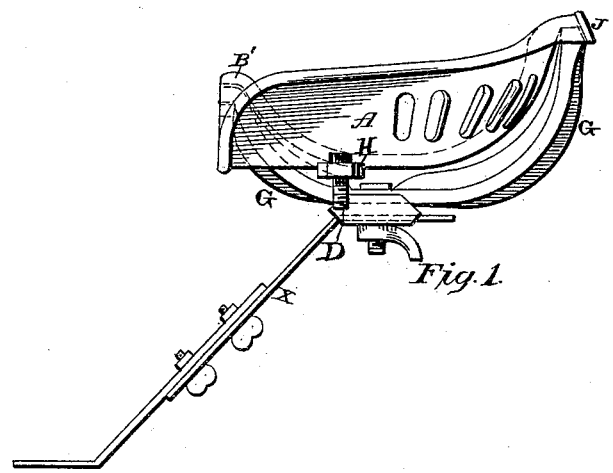
Figure 2:
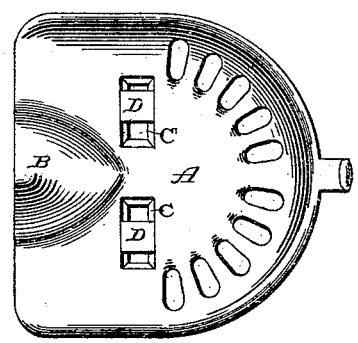
Figure 4:
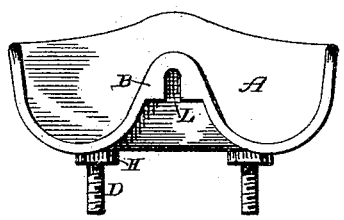
Figure 3:
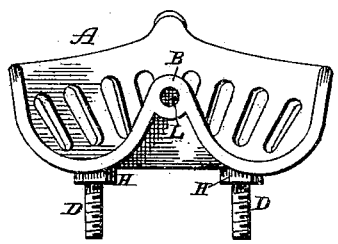

Figure 1, is a side elevation of a seat which embodies my invention. Fig. 2, is a plan view. Fig. 3, is an end view. Fig. 4, is an end view showing a slight modification.

A represents a metallic seat, which is adapted to be applied to any agricultural machine or vehicle. This seat may be made of cast metal with open or closed work, or pressed from iron or steel, or any other suitable material. The seat and its support are so constructed as to be easily attached to any form of spring or seat rest X, such as are usually used on any of the riding class of machines or vehicles for which the seat is designed. The front edge of the seat is raised as shown at B', where it extends up between driver's thighs. Through the bottom of the seat and extending at right angles to the line of draft are the two slots C, through which the bolts D, of suitable lengths are passed, and which bolts serve to regulate by striking against opposite edges of the support, the distance that the seat shall turn upon its pivots while the wheels are passing over uneven surfaces of any kind. In order to hold these bolts in any desired position and thus control the distance that the seat shall turn upon its pivots, each bolt is provided with a clamping nut H, by means of which it can be held securely in position.

In order to pivot the seat upon the rigid support G, the seat has a cup shaped socket J, upon its rear edge to receive the rear end of the support, and in the raised part B', at the front edge of the seat there is formed a suitable recess or socket L, which may have either an open ended slot, or an opening or bearing to receive the front end of the support G. The ends of this support G, will be made to correspond to the construction of the seat, but in case an open slot is used a wire or any suitable fastening may be used to prevent the seat from becoming detached from the end or ends of the support. This construction is a mere matter of choice, though both forms are here shown. The seat with its bearings in these forms attached to the supports G, has a free lateral or rocking motion while passing over uneven surfaces, or on the side of elevations, as one side of the machine or vehicle drops lower than the other, which causes a lateral or rocking movement. As either side rises or falls the seat turns upon its pivots which serve to overcome all unpleasant lateral motion, allowing the rider to sit in an upright position and not rendering him liable to be thrown from the seat. This seat may have the projections or bearings made separate and attached to it if so preferred, instead of having them formed as a part thereof.

For the purpose of raising and lowering the seat to accommodate the driver if desired, the spring X may be made in two parts which overlap each other, and these two parts are made adjustable back and forth upon each other at will.

Having thus described my invention, I claim—

In a seat of the character described the combination with a seat portion having a socket at each end forming a bearing, of a substantially U-shaped support having its ends turned outward to enter the said sockets, substantially as described.

In testimony whereof I affix my signature in presence of two witnesses.

GEORGE BANKS.

Witnesses:
FRED L. DEAN,
A. J. ECKER.